United States Patent

[11] 3,633,217

[72] Inventor Joseph R. Lance
        Irwin, Pa.
[21] Appl. No. 838,156
[22] Filed July 1, 1969
[45] Patented Jan. 11, 1972
[73] Assignee Westinghouse Electric Corporation
        Pittsburgh, Pa.

[54] ELECTROMAGNETIC ENERGY CONVERTER FOR PULSING AN IMPLANTABLE BLOOD PUMP
13 Claims, 9 Drawing Figs.

[52] U.S. Cl.................................................. 3/1,
        3/DIG. 2, 60/54.5 P, 60/54.6 P, 417/50, 417/389
[51] Int. Cl..................................................... A61f 1/24,
        F15b 7/00
[50] Field of Search............................................ 3/1, DIG. 2;
        128/1, 214; 417/50, 322, 383, 389, 410; 60/54.5 P,
        54.6 P; 310/11

[56] References Cited

UNITED STATES PATENTS

| | | | |
|---|---|---|---|
| 2,741,984 | 4/1956 | Lindenblad | 417/50 |
| 3,046,903 | 7/1962 | Jones | 128/DIG. 3 |
| 3,273,594 | 9/1966 | Mayer | 137/625.66 |
| 3,379,191 | 4/1968 | Harvey | 128/1 |
| 3,536,423 | 10/1970 | Robinson | 417/394 |

OTHER REFERENCES

" A Linear Oscillating Electromotor for Possible Application in an Intrathoracic Artificial Heart" by W. H. Burns et al. Trans. Amer. Society for Artificial Internal Organs, Vol. X, 1964, pages 151– 153.

" Solenoid Design for a Prosthetic Heart" by D. Freebairn et al., Trans Amer. Soc. Artif. Int. Organs, Vol. X, 1964, pages 166– 170.

" The Artificial Heart-Exemplar of Medical Engineering Enterprise" by N. Lindgren, IEEE Spectrum, Vol. 2, No. 9, 1965, pages 75 and 76.

*Primary Examiner*—Richard A. Gaudet
*Assistant Examiner*—Ronald L. Frinks
*Attorneys*—A. T. Stratton and Z. L. Dermer

ABSTRACT: In an artificial heart system suitable for permanent implantation within a human body, electrical power from an external source including a portable battery pack and a converter is transmitted across the intact chest wall through adjacent radio frequency induction coils, or a skin tunnel transformer, and converted to pulsatile blood-pumping power by means of an artificial heart package containing an electrical power conditioner and control subsystem, an electromagnetic energy converter, and the artificial ventricles and components of a blood pump. The energy converter comprises a magnetohydrodynamic solenoid which converts electrical power to alternating Lorentz forces in a low-temperature liquid metal working fluid. The alternating Lorentz hydraulic forces generated in the liquid metal are used to alternately compress the ventricles of a biventricular blood pump.

3,633,217

ELECTROMAGNETIC ENERGY CONVERTER FOR PULSING AN IMPLANTABLE BLOOD PUMP

BACKGROUND OF THE INVENTION

This invention relates, generally, to artificial-heart systems and, more particularly, to an electromagnetic energy converter for converting electrical power to pulsatile hydraulic power which may be utilized to compress the ventricles of an artificial blood pump or other devices requiring an oscillatory motion.

Prior electrical to mechanical converters have certain disadvantages, such as low power output, rubbing mechanical parts causing wear and reduced reliability, or they are bulky and inefficient, and, therefore, are not suitable for implantation within the human body. The present electromagnetic energy converter is based on well known Lorentz force and electromotive force principles. If an electrically conducting fluid is placed in a magnetic field and a voltage impressed on the fluid, the vector cross product of the resulting current and the applied magnetic field produces a Lorentz force within the fluid and the fluid moves in a direction perpendicular both to the current and to the applied magnetic field. The operation of magnetohydrodynamic generators, compressors and liquid metal pumps is based on the above Lorentz and electromotive force principles.

There have been proposals, such as described in U.S. Pat. No. 3,206,768, issued Sept. 21, 1965 to R. J. Preston, to pump blood by the direct application of Lorentz forces to the blood. Such schemes are impractical because of the low electrical conductivity of the blood. Because of this low conductivity, the efficiency of such devices would be so low that the resulting ohmic heating would denature the blood proteins.

In an electrohydraulic actuator described in U.S. Pat. No. 3,273,594, issued Sept. 20, 1966 to F. Mayer, electric current is obtained in the liquid through a varying induction produced by an alternating field and the operation is similar to that of asynchronous motor. As shown, the stator section of a linear asynchronous motor is arranged in the vicinity of a rectilinear section of pipe containing a conducting liquid. The stator includes two separate windings arranged with a relative shifting by one-quarter of a polar pitch. The two windings are fed by AC voltages at 90° from each other. Thus, four conductors extend between the actuator and the power source and the device is not suitable for implantation in the human body.

Accordingly, an object of this invention is to provide an electric to hydraulic energy converter having the following characteristics:

a. Volume and weight characteristics which will permit implantation within the human thoracic cavity (upper limits of 750 cm.$^3$ and 1,000 grams) with a hydraulic power output range of 1 to 7 watts.

b. A pulsatile hydraulic output, similar to the human heart hydraulic output waveform in both rate and stroke volume.

c. An electric to hydraulic conversion efficiency that is high enough to maintain the heat pump load from the artificial heart system to the biologic system within acceptable limits.

d. Control of the hydraulic power output in such a manner that the stroke volume can be varied while holding the rate constant.

Other objects of the invention will be explained fully hereinafter or will be apparent to those skilled in the art.

SUMMARY OF THE INVENTION

In accordance with one embodiment of the invention, an electromagnetic energy converter is integrated with a biventricular blood pump to form an artificial heart meeting the bioengineering requirements for implantation within the thoracic cavity. The energy converter comprises a generally cylindrical permanent magnet having an axially extending horseshoelike slot therethrough containing a conducting liquid metal therein with electrode connectors extending from the ends of the slot through the periphery of the magnet. Rolling-type diaphragms attached to opposite ends of the magnet to enclose the slot are actuated by the liquid to alternately compress the ventricles of the biventricular blood pump when an alternating voltage is applied to the connectors.

BRIEF DESCRIPTION OF THE DRAWINGS

For a better understanding of the nature and objects of the invention, reference may be had to the following detailed description, taken in conjunction with the accompanying drawings, in which.

DESCRIPTION OF THE PREFERRED EMBODIMENTS

Figure 1:
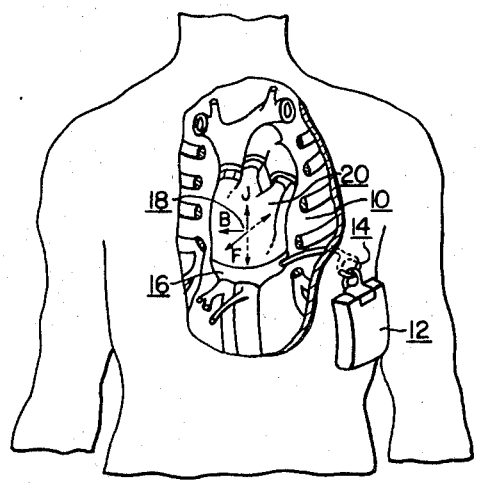
FIG. 1 is a diagrammatic view showing the elements of an artificial heart system embodying principal features of the invention.

Referring to the drawings, FIG. 1 shows the components of an artificial-heart system embodying the present invention. An artificial heart package 10 is permanently implanted in the patient's thoracic cavity in place of the natural heart. Electrical power from an external source including a portable battery pack and converter 12 is transmitted across the intact chest wall through adjacent radio frequency induction coils, or a skin transformer 14, and converted to pulsatile blood-pumping power by means of the artificial heart package 10. The package 10 includes an electrical power conditioner 16, an electromagnetic energy converter 18, and the artificial ventricles and components of a blood pump 20.

Coupled radio frequency coils, one outside of the body on the skin, excited with a high-frequency current (350 kc.), and one inside the chest, have been used experimentally with animals to transmit power through the intact chest wall. These coils are tuned with a capacitor so that the energy transmission takes place at the most efficient point, i.e., resonance of the coil circuit. To obtain good coupling, the distance between the coils cannot be more than a distance equal to one-third the diameter of a coil. Therefore, coils as large as possible are used.

The main disadvantage of the high-frequency transmission scheme is the unreliability of coil placement. The placement problem is derived from the motions that the coils can have in relation to each other.

The skin tunnel transformer method for transmitting electrical energy into a body through the intact chest wall has also been tried experimentally. This system requires the construction of a skin tunnel by a plastic surgeon. A coil of wire is implanted within the skin tunnel. A magnetic toroid core, which may be of a C-type is attached to the coil of wire and a second coil of wire from the power-generating equipment is placed around the core. This system constitutes a transformer with a primary and a secondary coil. Because of the geometry of the toroid transformer construction, the secondary coil and core may fit loosely in the skin tunnel without affecting the transmission of power. With either one of the two systems, it is possible to get transmission efficiencies that exceed 95 percent.

Figure 2:
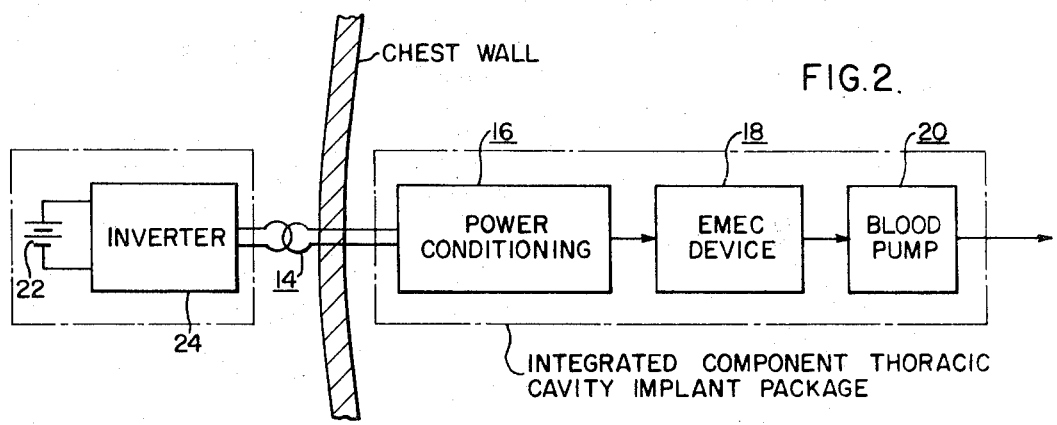
FIG. 2 is a block diagram of the system shown in FIG. 1.

A function diagram of the artificial-heart system is shown in FIG. 2. The system comprises a battery 22, an inverter 24 for converting DC power to high-frequency AC power, the transformer 14 for transmitting the power across the chest wall, the power conditioner 16, the electromagnetic energy converter 18 and the blood pump 20. Basically, the power conditioning substation 16 must convert 100–300 kilohertz input from the implanted RF coil or skin tunnel transformer to a 1–3-hertz (cycle per second) low-voltage output usable by the EMEC device. The power conversion may be accomplished by an intermediate step from 100–300 kilohertz to 100 v. DC using a full wave bridge rectifier and filter. The 100 v. DC may then be converted to the desired low-voltage waveform at 1–3 hertz. The input voltage for the EMEC device will depend on the particular configuration but will generally be about 0.2–0.5 volts RMS.

The EMEC device is based on the Lorentz force and electromotive force principles illustrated vectorially in FIG. 1. If an electrically conducting fluid, such as mercury or NaK (sodium-potassium eutectic), is placed in a magnetic field represented by the vector B and a voltage impressed on the fluid, represented by the vector J, the vector cross product of the resulting current and the applied magnetic field produces a Lorentz force within the fluid and the fluid moves in the direction shown by the vector F. If the conducting liquid is placed in a duct and each end of the duct is closed by a diaphragm, and an alternating voltage is applied to electrodes contacting the liquid, an oscillating electromagnetic energy converter is provided. If the diaphragms are directly coupled to the right and left ventricles of an artificial heart or blood pump, the alternate displacement of the diaphragms will pump the blood in a pulsatile manner. This is the basic configuration of the present EMEC artificial-heart system.

Figure 3:
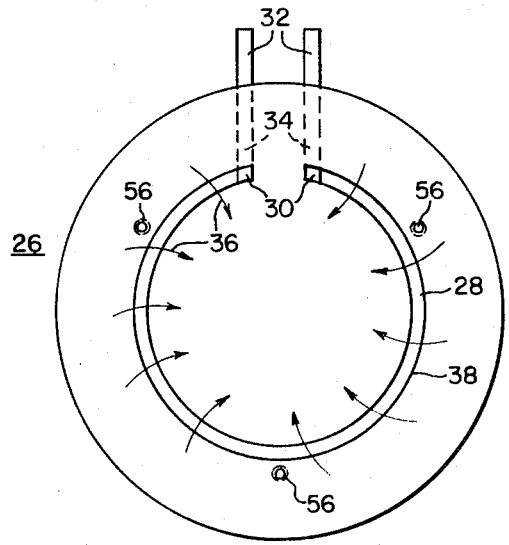
FIG. 3 and 4 are views, in end and side elevation, respectively, of a permanent magnet utilized in the energy converter for the artificial-heart system.
Figure 4:
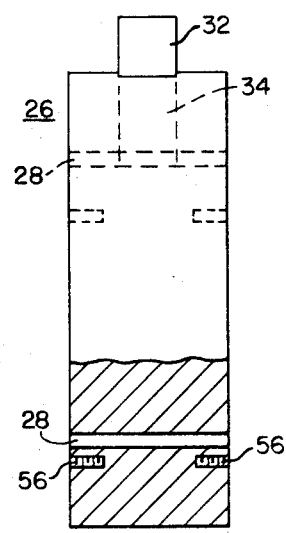

The magnetic field for the electromagnetic energy converter 18 is provided by a permanent magnet 26, preferably of the configuration shown in FIGS. 3 and 4. The magnet 26 is generally cylindrical with a horseshoe like slot 28 extending axially through the magnet. When assembled in the converter, the slot 28 contains the electrically conducting liquid, such as mercury or NaK. An electrode 30 is provided at each end of the horseshoe slot 28 in contact with the conducting liquid. The electrode connectors or conductors 32 extend from the electrodes 30 through the outer periphery of the magnet 26. The conductors 32 are disposed in slots 34 in the magnet 26. The magnetic flux lines are indicated by the arrows 36 in FIG. 3. The magnet 26 may be composed of alnico 5, or it may be composed of a ceramic material. If alnico is utilized, the walls of the slot 28 are coated with a suitable plastic 38 to provide electrical insulation. In view of the relatively low voltage applied to the conducting fluid a thin layer of plastic insulation will suffice.

Figure 5:
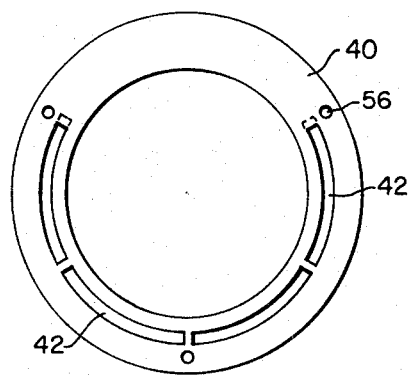
FIGS. 5 and 6 are views, in end and side elevation, respectively, of a guide vane utilized in the energy converter.
Figure 6:
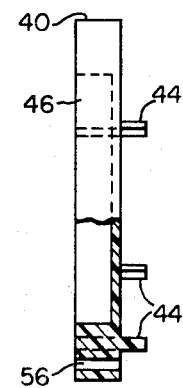

In order to prevent current fringing outside of the electrode-magnetic field region, an insulating plastic guide vane 40 is provided at each end of the magnet 26. As shown in FIGS. 5 and 6, each vane 40 is generally disclike in shape and has curved slots 42 extending therethrough which are aligned with the slot 28 in the magnet 26. Each vane 40 has tabs 44 thereon which extend into the magnet gap 28 to prevent current fringing. Each vane 40 also has a recess 46 therein for receiving a portion of a diaphragm 48 shown in FIG. 7. Thus, the plastic guide vanes also provide a mounting point for the diaphragms 48.

Figure 7:
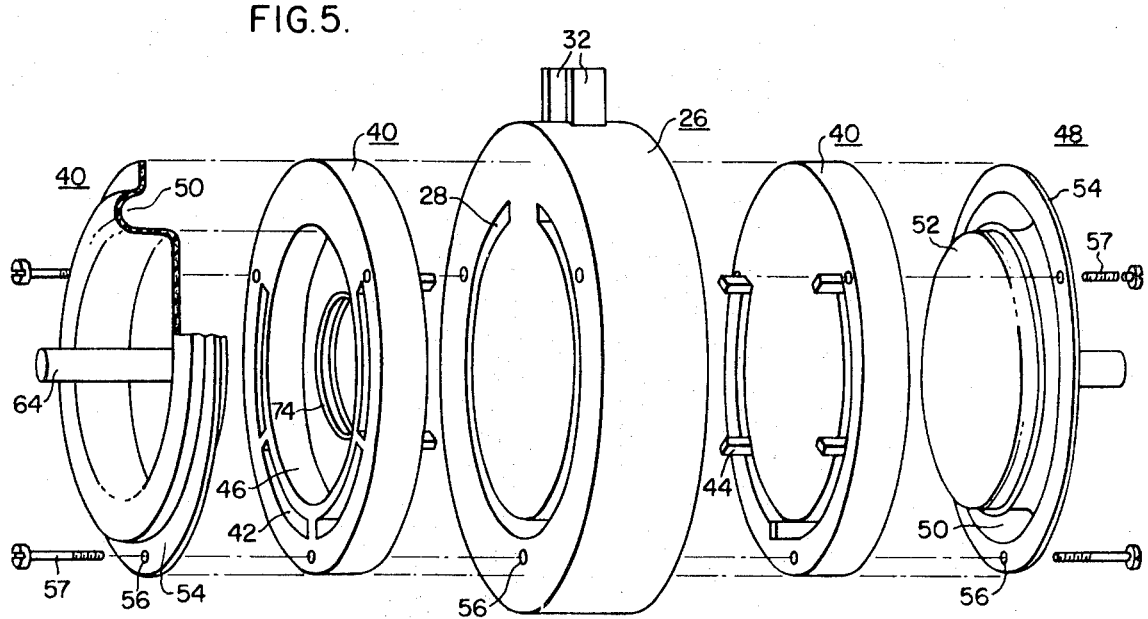
FIG. 7 is an exploded isometric view of the components of the electromagnetic energy converter.

An exploded view of the major components of the electromagnetic energy converter is shown in FIG. 7. These components including two diaphragms 48, two plastic guide vanes 40, and the permanent magnet 26 together with the contained liquid metal and electrode connections make up the energy converter. As shown, the diaphragms 48 are preferably of a rolling-type, each diaphragm having an annular portion 50 which is aligned with the slot 28 containing the conducting liquid and the slots 42 in the guide vanes 40 through which the liquid flows. Each diaphragm 48 has a flat surface 52 which extends into the recess 46 in the guide vane 40. Each diaphragm has an outwardly extending flange 54 having screw holes 56 therein for receiving screws 57 for attaching the diaphragm and a guide vane 40 to the magnet 26. The screws extend through holes 56 in the guide vane into threaded holes 56 in the magnet 26.

Figure 8:
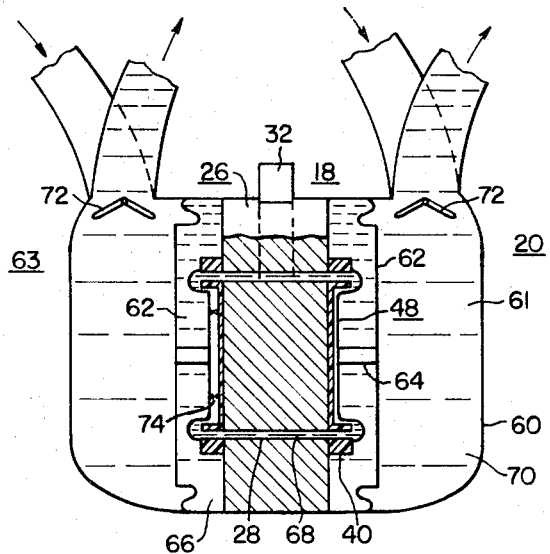
FIG. 8 is a diagrammatic view of the energy converter integrated with the blood pump.

The electromagnetic energy converter 18 may be integrated with a suitable biventricle blood pump 20 to form a complete replacement, electrically driven artificial heart. A diagrammatic view of an integrated biventricular EMEC artificial heart is illustrated in FIG. 8. The entire device is encapsulated in a rigid or semirigid polyurethane or silastic case 60 for compatibility with the body tissue. The device is contained within the center of the outer case 60 and drives the left ventricle 61 and the right ventricle 63 alternately through direct coupled pairs of diaphragms.

The blood pump 20 contains two spaced diaphragms 62 between which the converter 18 is disposed. Each diaphragm 62 is paired with a diaphragm 48 to which it is mechanically coupled by means of a connector 64. The diaphragms 62 are preferably composed of flexible polyurethane. The diaphragms 48 may be constructed of a fabric impregnated with an elastomeric sealant which has a relatively long life expectancy.

Each pair of diaphragms acts as a pressure to volume transducer. The space between the diaphragms of each pair may be filled with a heat-conducting fluid or liquid 66, such as pure water, to improve heat dissipation from the energy converter into the blood stream. As previously explained, the slot 28 in the magnetic 26 is filled with an electrically conducting fluid 68, such as mercury or NaK. There are the two diaphragm members 48, 62 and the intermediate fluid 66 separating the working fluid 68 from the blood 70 in the pump 20. Check valves 72, which may be of any suitable type previously developed for prosthetic applications, are provided to control the flow of blood into and out of the right and left ventricles of the pump.

A mechanical biasing spring 74 of the tension-type is attached to the diaphragms on the right side of the energy converter. This biasing spring serves several functions: it prevents simultaneous relaxation of both pairs of diaphragms; it provides a nondissipative method of matching the energy converter output to the different power requirements of the two ventricles; and operating at the resonant frequency of the combined biasing spring and system improves the efficiency. The spring 74 mechanically biases the ventricles so that the output of the left ventricle 61 is 80 percent of the total, as in the natural heart.

The electromagnetic energy converter artificial heart has an energy conversion efficiency approaching that of the natural heart. As a result, waste heat due to the inefficiency of the device can be rejected to the blood contained within the artificial ventricles and the surrounding tissues at temperatures well below the generally accepted tolerable limit for blood and tissue of 109.4° F. (43° C.). Also, the present artificial heart will provide sufficient blood pumping power for extensive rehabilitation while the weight and volume are small enough to permit implantation within the average user's thoracic cavity.

Figure 9:
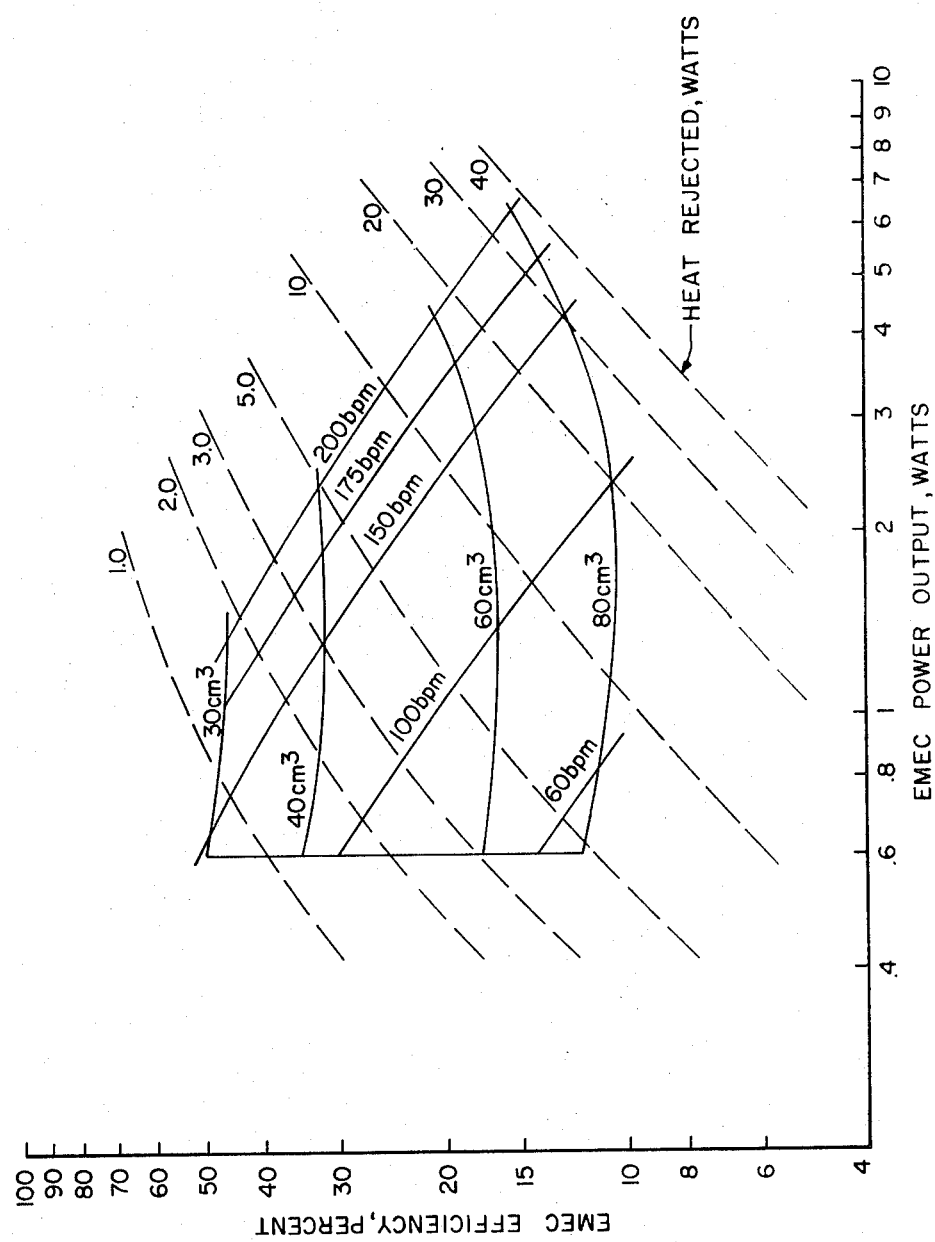
FIG. 9 is a graphical view showing operating characteristics of the energy converter.

FIG. 9 illustrates the potential performance of the electromagnetic energy converter artificial heart over the range of physiologically acceptable beat rate, stroke volume and power outputs. As shown in FIG. 9, good efficiency is obtained over the entire range of power output from one watt during sleeping hours up to 53 6 watts for short term high-exercise conditions. The waste heat rejected from the energy converter device is also indicated in FIG. 9. The magnitude of the rejected heat is such that it can be transferred directly to the surrounding tissue or pumped blood at temperatures which are physiologically acceptable without the necessity of an auxiliary blood heat exchanger.

The electromagnetic energy converter or magnetohydrodynamic solenoid pump has an additional advantage over most devices previously proposed for artificial heart pumps. That is, over the range of exercise, from minimal level to high level, the stroke volume of the biologic heart remains relatively constant, but at maximum exertion levels there is a final step increase of stroke volume. If this action is not duplicated by the artificial heart pump, heart rates that are higher than the normal biologic rate will be required for any given level of activity. Such a higher than normal rate is undesirable because of the unknown and possibly adverse affect on the vascular system.

For the magnetohydrodynamic solenoid pump the stroke volume and output flow rate of the pump can be increased by increasing the peak input voltage without changing the pump rate. This feature is a significant advantage over constant displacement piston or diaphragm type pumps which must operate at a higher rate to provide an increase in volume flow rate. The present blood pump can be constructed to meet the currently accepted criteria for minimizing thrombosis (blood clotting) and hemolysis (red blood cell destruction) and, because it is excited electrically, provides important control and synchronization advantages over previously proposed blood pumps.

From the foregoing description, it is apparent that the invention provides an electromagnetic energy converter artificial-heart system which has the following advantages:

1. No rotating components or bearings.
2. Minimum number of moving parts.
3. The entire system fits within the thoracic cavity volume.
4. The EMEC device operates at the natural heart beat rate.
5. The entire system has acceptable weight, efficiency and heat rejection.
6. External power is transmitted across the intact chest wall.

Since numerous changes may be made in the above-described construction and different embodiments of the invention may be made without departing from the spirit and scope thereof, it is intended that all subject matter contained in the foregoing description or shown in the accompanying drawings, shall be interpreted as illustrative and not in a limiting sense.

I claim:

1. An electromagnetic energy converter comprising a permanent magnet member having a pair of opposed surfaces and having a slot extending therethrough from one of said surfaces to the other, a pair of flexible diaphragm means positioned respectively adjacent said surfaces and covering the ends of said slot to enclose the space formed by said slot, an electrically conducting liquid disposed within said enclosed space, a pair of spaced electrode conductors in contact with the liquid and positioned such that upon energization of said conductors a force in said liquid is created in a direction generally perpendicular to said opposed surfaces, and terminal means for supplying alternating current to said conductors to create forces in said liquid to move said liquid reciprocally and alternately toward and away from each of said diaphragm means to impart reciprocal motion to said diaphragm means.

2. The energy converter defined in claim 1, including power conversion means to supply said alternating current to said terminal means with a frequency corresponding to the beat rate of a human heart.

3. The energy converter defined in claim 1, including a pair of flexible ventricle means mechanically coupled to said diaphragm means, respectively.

4. The energy converter defined in claim 1, wherein the permanent magnet member is generally cylindrical and the opposed surfaces comprises the axial surfaces of said member.

5. The energy converter defined in claim 4, wherein the magnet member is formed from a metal and wherein said slot has an insulating coating on the surfaces thereof.

6. The energy converter defined in claim 4, wherein the slot is horseshoelike in shape, and the electrode conductors extend from the ends of the slot through the outer periphery of the magnet.

7. The energy converter defined in claim 4, wherein the diaphragm means includes a converter diaphragm attached to each axial end of the magnet member to enclose said slot.

8. The energy converter defined in claim 7, wherein each converter diaphragm is of a rolling-type having an annular portion aligned with said slot.

9. The energy converter defined in claim 7, including an insulating disclike member disposed between each converter diaphragm and the magnet.

10. The energy converter defined in claim 9, wherein each disclike member has a slot therethrough aligned with the slot in the magnet and a recess therein receiving a portion of a converter diaphragm.

11. The energy converter defined in claim 3, wherein each flexible ventricle means includes a diaphragm portion paired with one of the diaphragm means.

12. The energy converter defined in claim 11, including spring means biasing one of said pair of diaphragm means and the diaphragm portion paired therewith toward the magnet.

13. The energy converter defined in claim 11, including a heat-conducting liquid disposed between each diaphragm means and that diaphragm portion paired therewith.

* * * * *